(12) United States Patent
Akimoto et al.

(10) Patent No.: US 10,027,454 B2
(45) Date of Patent: Jul. 17, 2018

(54) COMMUNICATION APPARATUS, METHOD FOR CONTROLLING SAME, BASE STATION APPARATUS, METHOD FOR CONTROLLING SAME, AND COMPUTER-READABLE STORAGE MEDIUM

(71) Applicant: KDDI R&D Laboratories, Inc., Fujimino-shi, Saitama (JP)

(72) Inventors: Yosuke Akimoto, Fujimino (JP); Satoshi Konishi, Fujimino (JP)

(73) Assignee: KDDI R&D Laboratories, Inc., Fujimino-shi (JP)

( * ) Notice: Subject to any disclaimer, the term of this patent is extended or adjusted under 35 U.S.C. 154(b) by 218 days.

(21) Appl. No.: 15/010,029

(22) Filed: Jan. 29, 2016

(65) Prior Publication Data

US 2016/0149678 A1     May 26, 2016

Related U.S. Application Data

(63) Continuation of application No. PCT/JP2014/003877, filed on Jul. 23, 2014.

(30) Foreign Application Priority Data

Jul. 30, 2013    (JP) ................ 2013-158261

(51) Int. Cl.
*H04L 1/00*     (2006.01)
*H04L 5/00*     (2006.01)
(Continued)

(52) U.S. Cl.
CPC ........... *H04L 5/0035* (2013.01); *H04B 7/024* (2013.01); *H04W 16/32* (2013.01);
(Continued)

(58) Field of Classification Search
CPC ...... H04B 17/00; H04B 3/46; H04B 7/18528; H04B 7/18571; H04B 7/18576;
(Continued)

(56) References Cited

U.S. PATENT DOCUMENTS 8,208,435 B2 * 6/2012 Higuchi ............... H04B 7/0632
370/329
8,982,817 B2 * 3/2015 Miki ....................... H04L 5/001
370/329

(Continued)

FOREIGN PATENT DOCUMENTS

EP     2 448 148 A1    5/2012
JP     2008-199423 A    8/2008
(Continued)

OTHER PUBLICATIONS

Office Action dated Apr. 7, 2017 in corresponding Japan Patent Application No. 2013-158261 and English Translation. (11 pages).
(Continued)

*Primary Examiner* — Dady Chery
(74) *Attorney, Agent, or Firm* — Fitch, Even, Tabin & Flannery LLP

(57) ABSTRACT

A communication apparatus performs communication in a manner such that communication with a first base station apparatus using a first frequency band and communication with a second base station apparatus using a second frequency band are switched on a per-subframe basis, obtains, from the first base station apparatus, specification information that specifies a subframe in which the first frequency band should be used and a subframe in which the second frequency band should be used among a plurality of subframes included in one or more frames, and performs control on the basis of the specification information to communicate with the first base station apparatus in the subframe in which the first frequency band should be used and with the second
(Continued)

base station apparatus in the subframe in which the second frequency band should be used.

30 Claims, 5 Drawing Sheets

(51) Int. Cl.
*H04B 7/024* (2017.01)
*H04W 16/32* (2009.01)
*H04W 76/15* (2018.01)
*H04W 72/04* (2009.01)

(52) U.S. Cl.
CPC ..... *H04W 72/042* (2013.01); *H04W 72/0413* (2013.01); *H04W 72/0446* (2013.01); *H04W 72/0453* (2013.01); *H04W 76/15* (2018.02); *H04W 72/04* (2013.01)

(58) Field of Classification Search
CPC ..... H04B 7/2121; H04B 7/2123; H04L 43/00; H04L 43/50; H04L 41/04; H04L 41/085; H04L 41/12; H04L 45/02; H04W 24/00; H04W 84/18; H04W 84/06
USPC .................................. 370/252, 329, 328, 330
See application file for complete search history.

(56) References Cited

U.S. PATENT DOCUMENTS

| | | | |
|---|---|---|---|
| 2011/0013543 A1* | 1/2011 | Lim | H04W 72/042 370/281 |
| 2012/0140689 A1* | 6/2012 | Pelletier | H04W 76/048 370/311 |
| 2013/0170467 A1* | 7/2013 | Ogawa | H04B 1/713 370/329 |
| 2014/0369223 A1* | 12/2014 | Takeda | H04J 11/0093 370/252 |

FOREIGN PATENT DOCUMENTS

| | | |
|---|---|---|
| JP | 2012-104959 A | 5/2012 |
| JP | 2013-17206 A | 1/2013 |
| JP | 2016-522654 A | 7/2016 |
| WO | 2009155385 A1 | 12/2009 |
| WO | 2012/163423 A1 | 12/2012 |
| WO | 2013/069218 A1 | 5/2013 |
| WO | 2014/202353 A1 | 12/2014 |

OTHER PUBLICATIONS

ST-Ericsson, Ericsson, "View on Rel-12"; 3GPP workshop; Jun. 12, 2012 (16 pages).
European Search Report dated Mar. 6, 2017 for European Patent Application No. 14832662.2. (12 pages).
Intel Corporation: "Challenges in the uplink to support dual connectivity", 3GPP Draft; R2-131986, May 2013.
KDDI Corporation: "Identification of small cell development scenarios and expected benefits of dual connectivity", 3GPP Draft; R2-130112, Jan. 28-Feb. 1, 2013.
International Search Report dated Oct. 21, 2014 for PCT/JP2014/003877 and English translation of the same. (4 pages).
Samsung; "Considerations on Dual Connectivity"; R1-131984; May 24, 2013.
Intel Corporation; "Dual Connectivity for UEs supporting one UL CC"; R2-131410; Apr. 19, 2013.
Fujitsu; "The challenges pf dual connectivity for single RX/TX capable UEs"; R2-131856; May 24, 2013.
Nokia Siemens Networks, Nokia; "On physical layer aspects of dual connectivity"; R1-132310; May 2013.

* cited by examiner

FIG. 5

| PATTERN | BAND | 0 | 1 | 2 | 3 | 4 | 5 | 6 | 7 | 8 | 9 |
|---|---|---|---|---|---|---|---|---|---|---|---|
| PATTERN 0 | FIRST FREQUENCY BAND | ON | OFF | OFF | OFF | OFF | ON | OFF | OFF | OFF | OFF |
| PATTERN 0 | SECOND FREQUENCY BAND | OFF | ON | ON | ON | ON | OFF | ON | ON | ON | ON |
| PATTERN 1 | FIRST FREQUENCY BAND | ON | OFF | OFF | OFF | ON | ON | ON | OFF | OFF | ON |
| PATTERN 1 | SECOND FREQUENCY BAND | OFF | ON | ON | ON | ON | OFF | ON | ON | ON | OFF |
| PATTERN 2 | FIRST FREQUENCY BAND | OFF | ON | OFF | ON | ON | ON | ON | OFF | ON | ON |
| PATTERN 2 | SECOND FREQUENCY BAND | ON | OFF | ON | OFF | OFF | OFF | ON | ON | OFF | OFF |
| PATTERN 3 | FIRST FREQUENCY BAND | ON | ON | ON | OFF | OFF | OFF | OFF | ON | ON | ON |
| PATTERN 3 | SECOND FREQUENCY BAND | OFF | OFF | OFF | OFF | OFF | OFF | ON | OFF | OFF | OFF |

SUBFRAME NUMBER shown across top (0–9).

COMMUNICATION APPARATUS, METHOD FOR CONTROLLING SAME, BASE STATION APPARATUS, METHOD FOR CONTROLLING SAME, AND COMPUTER-READABLE STORAGE MEDIUM

This application is a continuation of International Patent Application No. PCT/JP2014/003877 filed on Jul. 23, 2014, and claims priority to Japanese Patent Application No. 2013-158261 filed on Jul. 30, 2013, the entire content of both of which is incorporated herein by reference.

TECHNICAL FIELD

The present invention relates to a communication apparatus, a method of controlling the same, a base station apparatus, a method of controlling the same, and a computer-readable storage medium, and specifically to a technique to allow a communication apparatus to communicate with a plurality of base station apparatuses.

BACKGROUND ART

The $3^{rd}$ generation partnership project (3GPP) has given rise to a discussion about provision of many small cells within the coverage of a large cell (macrocell) in such a manner that the small cells use a different frequency band (e.g., a frequency band higher than a frequency band used by the macrocell). For instance, as shown in an example of FIG. 1, a plurality of small cells that use a 3.5-GHz frequency band are stationed within the coverage area of a macrocell that uses a 2-GHz frequency band.

With regard to LTE Release 12, a discussion has begun about a technique called Dual Connectivity whereby two types of base stations operate in coordination in a layer above a media access control (MAC) layer in the foregoing environment. The two types of base stations are a master eNB (e.g., a macro base station) that takes the initiative in communication control, and a secondary eNB (e.g., a small cell base station) that operates under the communication control. With Dual Connectivity, the two types of base stations are connected by a wired or wireless backhaul line, and the transmission traffic to a terminal is passed to the secondary eNB by way of the master eNB, for example. Thereafter, a signal that has been passed is transmitted as a wireless signal from the secondary eNB to the terminal. A signal transmitted from the terminal to the secondary eNB is transferred from the secondary eNB to the master eNB. That is to say, the entirety or a large part of the traffic passes through the master eNB at some point.

Although the backhaul line is required to have a large capacity, e.g., 1 Gbps, the requirement for the backhaul line with regard to a delay is, for example, at least 10 ms and is thus not relatively strict. Therefore, with Dual Connectivity, highly real-time data, such as control data for maintaining mobility (C-plane) and voice call traffic, is transmitted from the master eNB to the terminal, as shown in FIG. 2. On the other hand, best-effort user data that need not be real-time (U-plane), such as data for web browsing, is transmitted from the secondary eNB to the terminal. This enables data offloading to the secondary eNB without conducting a handover in association with connection to the secondary eNB.

PRIOR ART DOCUMENT(S)

Non-Patent Document

Non-patent document 1: Nokia Siemens Networks, R1-132310, "On physical layer aspect of dual connectivity," 3GPP TSG RAN WG1#74, May 2013

SUMMARY OF INVENTION

Problems that the Invention is to Solve

Dual Connectivity may cause a U-plane signal and a C-plane signal to occur simultaneously, that is to say, may cause the master eNB and the secondary eNB to transmit the signals to the terminal simultaneously. However, these signals cannot be received simultaneously if the terminal is not capable of receiving signals of two or more frequency bands simultaneously. Similarly, in this case, the terminal may not be capable of transmitting signals to both of the master eNB and the secondary eNB simultaneously.

In contrast, non-patent document 1 discusses a configuration in which the terminal switches between a frequency band used by the master eNB and a frequency band used by the secondary eNB to transmit or receive signals. With this configuration, the timings of transmission and reception of signals between the base stations and the terminal are controlled, and the terminal can connect to the secondary eNB without conducting a handover to the secondary eNB even if the terminal is not capable of receiving signals of two or more frequency bands simultaneously.

The proportion of a time period in which the terminal communicates with the master eNB and the proportion of a time period in which the terminal communicates with the secondary eNB should be determined on the basis of the amount of signals exchanged between the eNBs and the terminal. For example, in the absence of best-effort data that should be transmitted from the secondary eNB, it is sufficient to secure many occasions to communicate with the master eNB, and secure occasions to communicate with the secondary eNB to maintain synchronization. However, there has been no discussion about a mechanism to dynamically switch between an occasion to connect to the master eNB and an occasion to connect to the secondary eNB.

The present invention has been made in view of the above problems, and aims to provide a control technique that allows a terminal to dynamically switch between an occasion to connect to a master eNB and an occasion to connect to a secondary eNB.

Means of Solving the Problems

To achieve the above aim, a communication apparatus of the present invention includes: a communication unit configured to perform communication in a manner such that communication with a first base station apparatus using a first frequency band and communication with a second base station apparatus using a second frequency band are switched on a per-subframe basis; an obtaining unit configured to obtain specification information from the first base station apparatus, the specification information specifying, among a plurality of subframes included in one or more frames, a subframe in which the first frequency band is to be used and a subframe in which the second frequency band is to be used; and a control unit configured to control the communication unit, on the basis of the specification information, to communicate with the first base station apparatus in the subframe in which the first frequency band is to be used, and to communicate with the second base station apparatus in the subframe in which the second frequency band is to be used.

Furthermore, to achieve the above aim, a base station apparatus of the present invention is included in a wireless communication system and communicates with a communication apparatus using a first frequency band, the wireless communication system also including the communication apparatus that performs communication while switching between the first frequency band and a second frequency band on a per-subframe basis, and another base station apparatus that communicates with the communication apparatus using the second frequency band. The base station apparatus includes: a notification unit configured to notify the communication apparatus and the other base station apparatus of specification information that specifies, among a plurality of subframes included in one or more frames, a subframe in which the communication apparatus is to use the first frequency band and a subframe in which the communication apparatus is to use the second frequency band; and a communication unit configured to communicate with the communication apparatus using the subframe in which the communication apparatus is to use the first frequency band as specified by the specification information.

Effects of the Invention

The present invention allows a terminal to dynamically switch between an occasion to connect to a master eNB and an occasion to connect to a secondary eNB.

Further features and advantages of the present invention will become apparent from the following description with reference to the attached drawings. Note that the same reference numerals denote the same or similar components throughout the accompanying drawings.

BRIEF DESCRIPTION OF DRAWINGS

The accompanying drawings are included in the specification, constitute a part thereof, show embodiments of the present invention, and are used to illustrate the principle of the present invention together with the description thereof.

FIG. 5 depicts examples of patterns specifying a frequency band that should be used on a per-subframe basis;

DESCRIPTION OF EMBODIMENTS

An embodiment of the present invention will be described below in detail with reference to the attached drawings.

(System Configuration)

Figure 1:
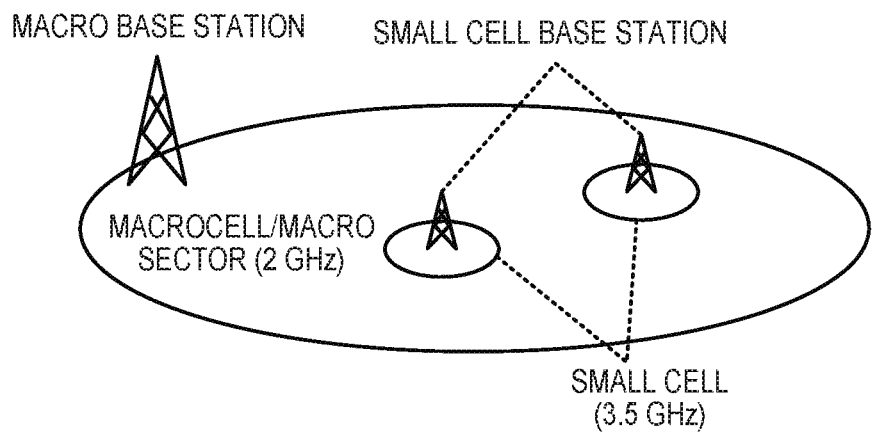
FIG. 1 is a conceptual diagram showing an example of arrangement of a macrocell and small cells that use different frequency bands.
Figure 2:
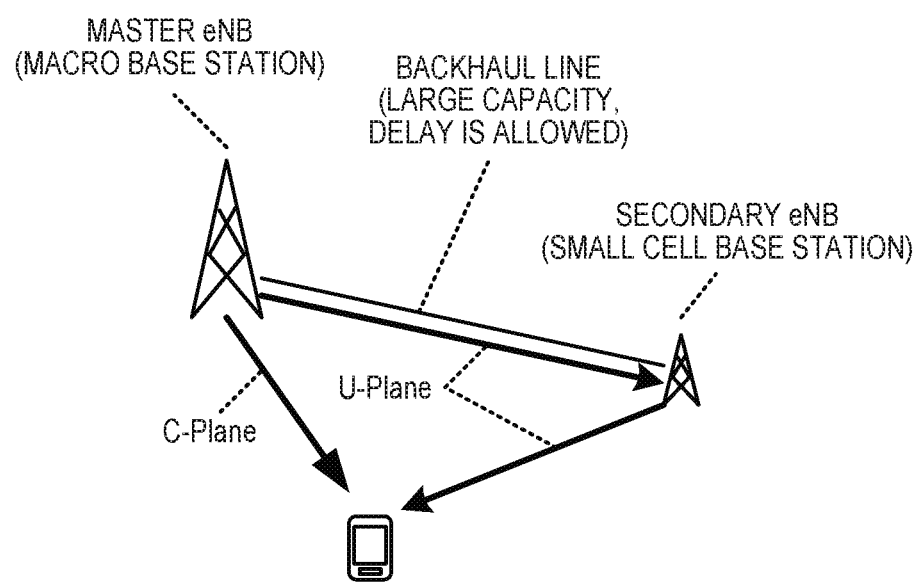
FIG. 2 is a conceptual diagram showing an example of communication among a terminal and a plurality of eNBs based on Dual Connectivity.

As shown in FIG. 2, a wireless communication system according to the present embodiment includes, for example, a master eNB, a secondary eNB, and a terminal. The eNBs are base station apparatuses herein, but a system with which the eNBs are compatible may not be an LTE system. The terminal is a mobile or fixed wireless communication apparatus, and may be compatible with a non-LTE wireless communication system. In the wireless communication system according to the present embodiment, the master eNB performs communication using a first frequency band (e.g., 2 GHz), whereas the secondary eNB performs communication using a second frequency band (3.5 GHz).

In the present embodiment, the master eNB and the secondary eNB are connected by a wired or wireless communication line (backhaul line). A downlink signal arrives at the terminal by being transmitted as a wireless signal directly from the master eNB to the terminal, or by being transferred from the master eNB to the secondary eNB and then transmitted as a wireless signal from the secondary eNB to the terminal. An uplink signal arrives at the master eNB by being transmitted directly from the terminal to the master eNB, or by being transmitted from the terminal to the secondary eNB and then transferred from the secondary eNB to the master eNB. That is to say, signals are transmitted to and from the terminal by way of the master eNB. Accordingly, the master eNB can monitor communication with the terminal, and perform control as to which frequency band the terminal should use or which eNB the terminal should communicate with at which timing, on the basis of the amount of real-time traffic and the amount of best-effort traffic, for example. The master eNB can also perform control as to which frequency band the terminal should use or which eNB the terminal should communicate with at which timing, on the basis of the size of data exchanged with the terminal.

In some cases, communication performed by the terminal with another apparatus that is connected directly to the secondary eNB bypasses the master eNB. In such cases, the master eNB may take the initiative in the following communication control by, for example, receiving a notice of information related to the amount of communication between the secondary eNB and the terminal from the secondary eNB.

The master eNB generates specification information that specifies frequency bands that should be used by the terminal in one-to-one correspondence with a plurality of subframes included in one or more frames, and notifies the terminal and the secondary eNB of the specification information. The specification information includes, for example, at least one of information that specifies subframes in which the terminal should use the first frequency band (should communicate with the master eNB) and information of subframes in which the terminal should use the second frequency band (should communicate with the secondary eNB). The specification information notified to the terminal may differ from the specification information notified to the secondary eNB. For example, the terminal may be notified of information of subframes in which the first frequency band should be used and subframes in which the second frequency band should be used, whereas the secondary eNB may be notified only of subframes in which the second frequency band should be used. Furthermore, the master eNB determines the ratio at which the frequency bands should be used, as well as the amount of data to be offloaded to the secondary eNB, in accordance with the frequencies of occurrences of data addressed to the terminal that needs to be real-time, and best-effort data addressed to the terminal.

The master eNB transmits a signal to the terminal, or waits for a signal from the terminal, in subframes in which the terminal should use the first frequency band in accordance with the specification information notified to the terminal and the secondary eNB. When the master eNB holds a signal addressed to the terminal at the time of a subframe in which the first frequency band should not be used, the master eNB waits for a subframe in which the first frequency band should be used, and then transmits the signal addressed to the terminal.

It will be assumed that the terminal cannot perform communication using both the first and second frequency bands simultaneously. To perform communication, the terminal switches between the frequency bands to be used on the basis of the specification information notified from the master eNB, that is to say, the specification information specifying subframes in which the first frequency band should be used and/or subframes in which the second frequency band should be used. Subframes in which the first frequency band should be used are subframes in which intended communication should be performed with the master eNB and should not be performed with the secondary eNB. Similarly, subframes in which the second frequency band should be used are subframes in which intended communication should be performed with the secondary eNB and should not be performed with the master eNB. That is to say, in the case of a downlink signal, the signal is waited for while switching between the frequency bands in conformity with the specification information, and the signal is received from the master eNB in subframes in which the first frequency band should be used, and from the secondary eNB in subframes in which the second frequency band should be used. In the case of an uplink signal, for example, with regard to data that needs to be real-time, a subframe in which the first frequency band should be used is waited for, and then the signal is transmitted to the master eNB in that subframe. On the other hand, with regard to best-effort data, the terminal transmits the signal to the secondary eNB in subframes in which the second frequency band should be used.

On the basis of the specification information notified from the master eNB, the secondary eNB transmits a signal addressed to the terminal using the second frequency band, or waits for a signal from the terminal, in subframes in which the terminal should use the second frequency band. The secondary eNB obtains a signal addressed to the terminal by receiving the signal transferred from the master eNB, and transfers a signal received from the terminal to the master eNB. When there is communication that bypasses the master eNB, such as communication only between the terminal and another apparatus connected to the secondary eNB, the occurrence of the communication may be reported to the master eNB.

As such, the master eNB determines the frequency bands that the terminal should use in the subframes, and notifies the terminal and the secondary eNB of the determined frequency bands; therefore, the master eNB, the secondary eNB, and the terminal can share information indicating the timings of communication thereamong. This enables control over the ratio between connection from the terminal to the master eNB and connection from the terminal to the secondary eNB in accordance with, for example, the ratio between the occurrence of data that needs to be real-time and the occurrence of best-effort data. Furthermore, as the master eNB collects data addressed to the terminal and data received from the terminal, communication control that is appropriate for the terminal can be performed on the basis of data that is actually exchanged with the terminal.

The configurations and operations of the eNBs and the terminal will be described below in detail.

(Hardware Configuration of Base Stations and Terminal)

Figure 3:
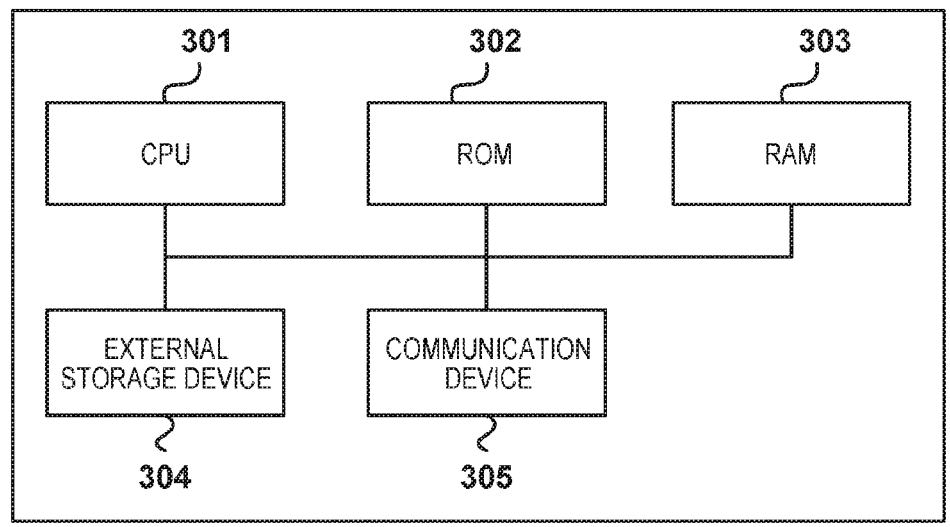
FIG. 3 depicts an example of a hardware configuration of a master eNB, a secondary eNB, and the terminal.

FIG. 3 depicts an example of a hardware configuration of the master eNB, the secondary eNB, and the terminal. In one example, the master eNB, the secondary eNB, and the terminal have a hardware configuration similar to the one shown in FIG. 3, including a CPU 301, a ROM 302, a RAM 303, an external storage device 304, and a communication device 305. In the master eNB, the secondary eNB, and the terminal, for example, the CPU 301 executes a program that is recorded in one of the ROM 302, the RAM 303, and the external storage device 304 and realizes the following functions of the master eNB, the secondary eNB, and the terminal. The master eNB, the secondary eNB, and the terminal use the communication device 305 to realize communication between the master eNB or the secondary eNB and the terminal, or inter-eNB communication between the master eNB and the secondary eNB. Although the master eNB, the secondary eNB, and the terminal include one communication device 305 in FIG. 3, the eNBs may include, for example, a communication device for inter-eNB communication and a communication device for communication with the terminal. The terminal may include, for example, a plurality of communication devices that operate in coordination in a layer above a MAC layer and are in one-to-one correspondence with a plurality of frequency bands.

The master eNB, the secondary eNB, and the terminal may include dedicated hardware that executes the following functions, or may execute a part of the following functions using hardware and a remaining part of the following functions using a computer that causes the program to operate. They may execute all of the following functions using the computer and the program.

(Functional Configuration of Master eNB)

Figure 4:
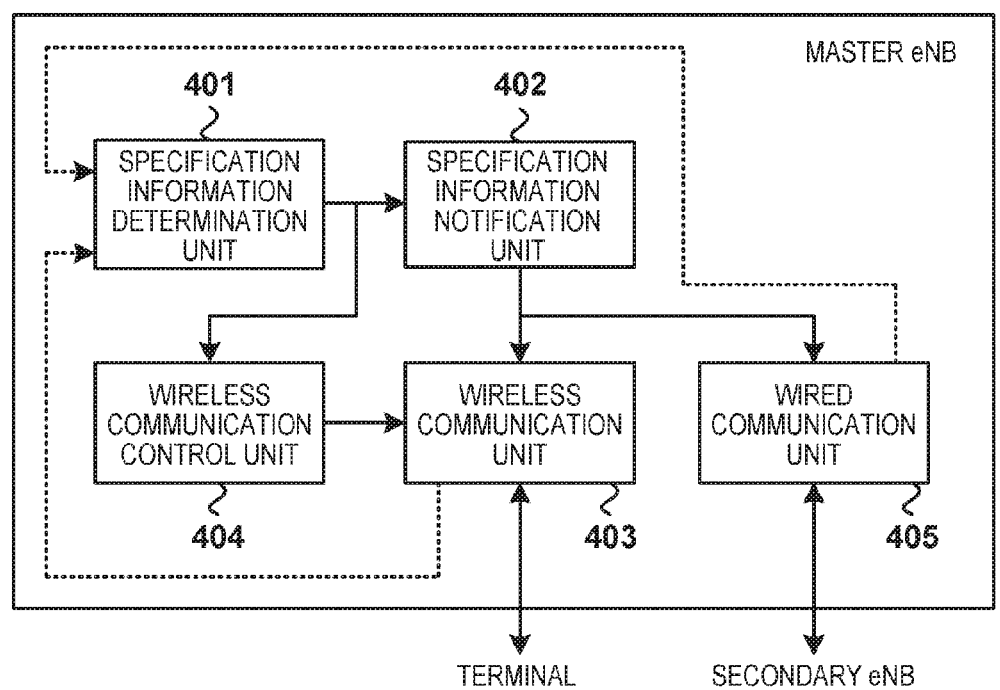
FIG. 4 is a block diagram showing an example of a functional configuration of the master eNB.

FIG. 4 is a block diagram showing an example of a functional configuration of the master eNB. The master eNB includes, for example, a specification information determination unit 401, a specification information notification unit 402, a wireless communication unit 403, a wireless communication control unit 404, and a wired communication unit 405. It will be assumed that the master eNB also has functions of a general base station apparatus, although not shown in FIG. 4. For example, the master eNB further has a function of connecting to a core network, a function of obtaining data for wireless or wired communication, a function of generating a signal for wireless or wired communication from the data, and the like.

The specification information determination unit 401 determines subframes in which the terminal should use the first frequency band and subframes in which the terminal should use the second frequency band among the plurality of subframes included in one or more frames. When the terminal connects to two or more secondary eNBs, it is permissible to determine which secondary eNB the terminal should connect to in each subframe. In this case, for example, when the secondary eNBs use different 20-MHz frequency bands in the 3.5-GHz band, it is permissible to determine which frequency band should be used among those frequency bands.

The specification information determination unit 401 may determine the ratio at which the plurality of frequency bands should be used from the results of communication performed by the wireless communication unit 403 and the wired communication unit 405. For example, when there is a large amount of highly real-time traffic in association with voice call data or the like transmitted or received by the wireless communication unit 403, the specification information determination unit 401 increases the proportion of subframes in which the first frequency band should be used. On the other hand, when there is a small amount of highly real-time traffic, it is permissible to increase the proportion of subframes in which the second frequency band should be used so as to cause the terminal to communicate with the secondary eNB. When the wired communication unit 405 is transmitting or receiving a large amount of data, the specification information determination unit 401 may increase the proportion of subframes in which the second frequency band should be used.

When there are a plurality of terminals, the specification information determination unit 401 executes the foregoing determination processing on a per-terminal basis. In this case, the allocation of subframes in which the first frequency band should be used with respect to a certain terminal may be used as the basis to determine the allocation of subframes in which the first frequency band should be used with respect to another terminal. For example, subframes other than the subframes in which the certain terminal should use the first frequency band may be the subframes in which another terminal should use the first frequency band. This can prevent the omnipresence of terminals that use the first frequency band on a per-subframe basis, and allows the terminals to perform communication using the first frequency band at a higher possibility. A similar allocation method may be used for the second frequency band as well. In this case, the allocation may be determined in such a manner that the subframes in which the second frequency band is used vary among terminals present within the same small cell.

The specification information determination unit 401 may determine the frequency bands that should be used in such a manner that the terminal always uses the first frequency band in a predetermined subframe of the plurality of subframes included in one or more frames. In this case, for example, the master eNB transmits a specific control signal in the predetermined subframe, and the terminal accordingly observes the control signal without fail. By thus setting a subframe in which the first frequency band should always be used, connectivity from the terminal to the master eNB can be secured. When the terminal is performing communication control in conformity with incorrect specification information, the master eNB can re-notify the terminal of correct specification information in the predetermined subframe. Similarly, the specification information determination unit 401 may determine the frequency bands that should be used in such a manner that the terminal always uses the second frequency band in a second predetermined subframe. In this case, for example, the secondary eNB transmits a specific control signal in the second predetermined subframe, and the terminal accordingly receives the control signal; consequently, connectivity from the terminal to the secondary eNB can be secured.

The specification information notification unit 402 generates specification information for specifying the frequency bands that the terminal should use in the subframes, as determined by the specification information determination unit 401. Then, for example, the specification information notification unit 402 notifies the terminal of the specification information via the wireless communication unit 403, and notifies the secondary eNB of the specification information via one of the wireless communication unit 403 and the wired communication unit 405.

A description is now given of an exemplary method of giving notice of the specification information. The master eNB and the terminal both store information of at least two different patterns that specify subframes in which the first frequency band should be used and subframes in which the second frequency band should be used as specification patterns that specify the frequency bands to be used. The master eNB notifies the terminal of information that specifies which of the at least two specification patterns should be used in actual communication as specification information. In this case, for example, when the number of the specification patterns is two, the specification information notification unit 402 can notify the terminal of the specification information using one bit representing "0" or "1." In this case, for example, giving notice of the specification information via a physical downlink control channel (PDCCH) enables high-speed and dynamic switching between the specification patterns to be used.

The specification information notification unit 402 may prepare a plurality of candidates for the aforementioned specification patterns beforehand, and specify which of the candidates should be used as the specification patterns before giving notice of the specification information. For example, these candidates may be set in accordance with the specifications and the like and stored in the terminal and the eNBs beforehand, or a network may notify the master eNB of these candidates at a constant frequency and then the master eNB may notify the terminal and the secondary eNB of these candidates.

In this case, the specification information notification unit 402 gives notice of the indexes of at least two specification patterns that could be actually specified by the specification information for use among the plurality of candidates. For example, as shown in FIG. 5, the specification information notification unit 402 stores four candidates for the specification patterns beforehand, and notifies the terminal of information that specifies two of the four candidates, e.g., "0" and "3." Upon receiving this notification, the terminal registers pattern 0 and pattern 3 shown in FIG. 5 as, for example, specification pattern 0 and specification pattern 1 in a register. Then, the terminal waits for a subsequent transmission of the specification information that specifies one specification pattern to be actually used among these two specification patterns. Thereafter, the master eNB gives notice of one pattern that should be actually used among pattern 0 and pattern 3 shown in FIG. 5 using one bit, i.e., "0" or "1." For example, if the terminal receives a bit representing "0," then the terminal acknowledges that specification pattern 0, i.e., pattern 0 shown in FIG. 5 should be used. Similarly, if the terminal receives a bit representing "1," then the terminal acknowledges that specification pattern 1, i.e., pattern 3 shown in FIG. 5 should be used. The bit representing "0" and the bit representing "1" may correspond to specification pattern 1 and specification pattern 0, respectively. By thus storing a plurality of candidates for the specification patterns beforehand and giving notice of information that narrows the candidates down to at least two candidates that could be actually specified by the specification information, the terminal and the master eNB can flexibly share the specification patterns with a small amount of information.

In any subframe labeled "ON" in FIG. 5, the terminal should use the frequency band corresponding thereto. The actual information may express "ON" using a bit representing "1" and "OFF" using a bit representing "0," and can be stored in the form of bitmaps. In this case, for example, pattern 0 is expressed as 1000010000 and pattern 3 is expressed as 1011101111 on the basis of the first frequency band. Pattern 0 may be expressed as 0111101111 and pattern 3 may be expressed as 0100001000 on the basis of the second frequency band. When there are three or more frequency bands, such bitmaps may be generated to have "1" for each frequency band to indicate that the frequency band should be used. In the example of FIG. 5, one of the first and second frequency bands is allocated to every subframe as the frequency band that should be used; however, neither of the frequency bands may be allocated. Note that "1" may indicate "OFF" and "0" may indicate "ON."

The specification information notification unit 402 may give notice of information of the specification patterns by directly notifying the terminal of the aforementioned bitmaps, rather than using the indexes of the candidates for the specification patterns stored beforehand. That is to say, before giving notice of the specification information, the specification information notification unit 402 may notify the terminal of 1000010000 equivalent to pattern 0 shown in FIG. 5 as specification pattern 0, and 1011101111 equivalent to pattern 3 shown in FIG. 5 as specification pattern 1. This eliminates the need for the master eNB and the terminal to store information of the common candidates for the specification patterns shown in FIG. 5 beforehand, and makes it easy to allocate the frequency bands that should be used by the terminal in a flexible manner. The specification information notification unit 402 may give notice of information of the frequency bands that should be used in the subframes at that point in the form of a bitmap, not as the information of the specification patterns, but as the specification information.

Although the candidates for the patterns shown in FIG. 5 represent examples of allocation of the frequency bands that should be used within one frame, a plurality of frames may be regarded as one unit, and the frequency bands that should be used may be allocated to subframes included in the unit. That is to say, the frequency bands that should be used may be allocated in units of one or more frames, e.g., in 20-subframe units or 30-subframe units, instead of 10-subframe units.

The wireless communication unit 403 communicates with the terminal using the first frequency band. The terminal is notified of the aforementioned specification information via the wireless communication unit 403. For example, after transmitting the aforementioned specification information to the terminal, the wireless communication unit 403 can receive, from the terminal, a confirmation signal (e.g., ACK) representing a confirmation that the terminal has been notified of the specification information. For example, when the wireless communication unit 403 has not received the confirmation signal from the terminal within a predetermined time period since the notification of the specification information, it may determine that the specification information has not been received accurately and re-notify the terminal of the specification information. The wireless communication unit 403 may notify the terminal of the specification information also when it has received the confirmation signal even though it has not given notice of the specification information. In this way, when the terminal has erroneously switched between the frequency bands that should be used due to its determination that it has received the specification information even though it has not actually been notified of the specification information, such erroneous switching can be corrected.

When the confirmation signal from the terminal contains information related to the specification information notified to the terminal, whether the specification information contained in the confirmation signal matches the specification information that has actually been notified may be determined; if they do not match, the terminal may be re-notified of the specification information that has actually been notified. For example, when the wireless communication unit 403 has given notice of specification information indicating "1" but received a confirmation signal containing information to the effect that specification information indicated "0" from the terminal, the specification information indicating "1" may be re-transmitted to the terminal. In this way, the terminal can be notified of the specification information accurately.

The wireless communication control unit 404 controls the wireless communication unit 403. Specifically, on the basis of the frequency bands that should be used by the terminals in each of the subframes as determined by the specification information determination unit 401, the wireless communication unit 403 is controlled to communicate with the terminal in the subframes in which the first frequency band should be used. As a predetermined time period for transmission and processing is required to notify the terminal and the secondary eNB of the specification information, the terminal and the secondary eNB cannot operate in conformity with the specification information immediately after the transmission of the specification information. Therefore, for example, the wireless communication control unit 404 starts control over the wireless communication unit 403 on the basis of the result of determination by the specification information determination unit 401 after a predetermined time period has elapsed since the notification of the specification information. Similarly, in view of a transmission delay and the like, the terminal and the secondary eNB start operations based on the specification information after the predetermined time period has elapsed.

For example, the wireless communication control unit 404 may start control over the wireless communication unit 403 on the basis of the result of determination by the specification information determination unit 401 after a predetermined time period has elapsed since it received the confirmation signal from the terminal. In this way, communication control is started in conformity with the specification information upon confirming that the terminal has accurately received the specification information, and thus the terminal and the master/secondary eNB reliably operate in accordance with common specification information.

The wired communication unit 405 communicates with the secondary eNB via a wired line. When communication with the secondary eNB is performed wirelessly, the wired communication unit 405 may not be provided. It will be assumed here that a wired line is used in communication with the secondary eNB. For example, the wired communication unit 405 transfers, to the secondary eNB, data that should be wirelessly transmitted from the secondary eNB to the terminal, such as best-effort data addressed to the terminal. It also receives a signal that is transferred from the secondary eNB following the transmission of the signal from the terminal to the secondary eNB.

The wired communication unit 405 also notifies the secondary eNB of the specification information. The wired communication unit 405 may transmit the specification information to the secondary eNB at the same time as when the wireless communication unit 403 notifies the terminal of the specification information, or may transmit the specification information to the secondary eNB after the wireless communication unit 403 has received the confirmation signal from the terminal. When the specification information is transmitted to the terminal and the secondary eNB simultaneously, the frequency bands to be used can be controlled at high speed in conformity with the determination by the specification information determination unit 401, on the precondition that the terminal can receive the specification information. On the other hand, when the specification information is transmitted after the reception of the confirmation signal, the secondary eNB can be instructed to perform control in accordance with the determination by the specification information determination unit 401 in a state where the terminal reliably conforms to the determination.

(Functional Configuration of Secondary eNB)

Figure 6:
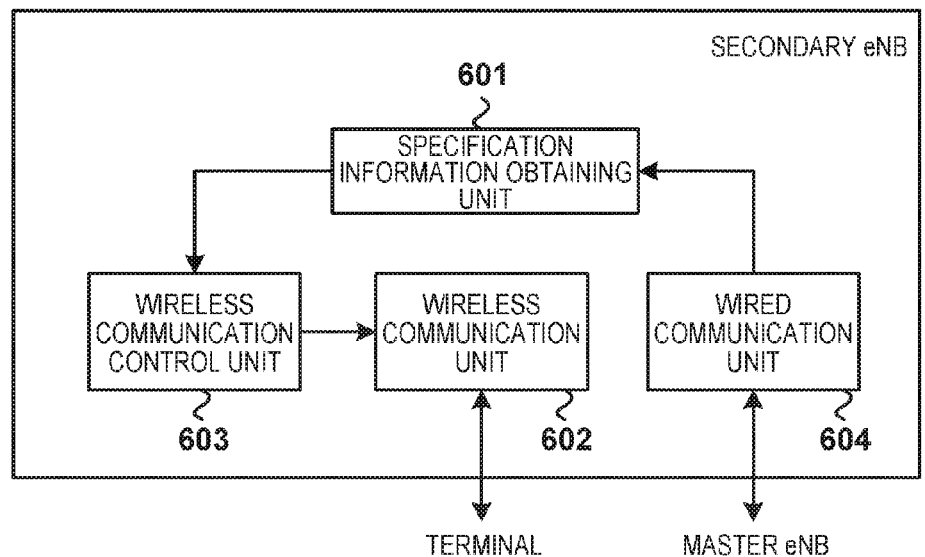
FIG. 6 is a block diagram showing an example of a functional configuration of the secondary eNB.

FIG. 6 is a block diagram showing an example of a functional configuration of the secondary eNB. The secondary eNB includes, for example, a specification information obtaining unit 601, a wireless communication unit 602, a wireless communication control unit 603, and a wired communication unit 604. It will be assumed that the secondary eNB also has functions of a general base station apparatus, although not shown in FIG. 6. For example, the secondary eNB further has a function of obtaining data for wireless or wired communication, a function of generating a signal for wireless or wired communication from the data, and the like.

The specification information obtaining unit 601 receives and obtains the specification information from the master eNB via the wired communication unit 604, for example. This specification information need not be specification information with a few bits that is notified from the master eNB to the terminal. This is because when the specification information is transmitted via a wired line, the amount of specification information is small enough to exert no influence on the overall quality. That is to say, for example, the specification information may not be one-bit information, and may be information that specifies subframes in which the terminal should use the second frequency band among a plurality of subframes included in one or more frames. The master eNB may also notify the secondary eNB of information indicating to which terminal the specification information is addressed.

In the subframes in which the terminal should use the second frequency band as specified by the specification information, the wireless communication unit 602 communicates with the terminal using the second frequency band. In the subframes in which the terminal should use the second frequency band as specified by the specification information, the wireless communication control unit 603 controls the wireless communication unit 602 to transmit a signal addressed to the terminal or receive a signal from the terminal.

The wireless communication control unit 603 may start communication control in accordance with the specification information after a predetermined time period has elapsed since the specification information obtaining unit 601 obtained the specification information. This predetermined time period is set in consideration of a delay in communication between the master eNB and the secondary eNB. Specifically, when the master eNB notifies the terminal and the secondary eNB of the specification information simultaneously, the predetermined time period may have a value obtained by subtracting the delay in communication between the master eNB and the secondary eNB from a time period between the obtainment of the specification information and the start of communication control by the terminal. Further in view of a delay in radio propagation between the master eNB and the terminal, the predetermined time period may be obtained by adding this delay in propagation to the foregoing value. Note that the delay in propagation between the terminal and the master eNB can be ignored as it is sufficiently small compared to a delay between the eNBs. When communication control based on the specification information is thus started after the predetermined time period has elapsed since the obtainment of the specification information, the terminal and the secondary eNB can be synchronized in communication control.

On the other hand, when the master eNB notifies the secondary eNB of the specification information after receiving the confirmation signal from the terminal, the predetermined time period may have a value obtained by subtracting the delay in communication between the master eNB and the secondary eNB from a time period between the transmission of the confirmation signal and the start of communication control by the terminal. Alternatively, the predetermined time period may be obtained by subtracting a delay in signal propagation between the terminal and the master eNB from the foregoing value.

The wired communication unit 604 receives data addressed to the terminal from the master eNB, and transfers a signal received from the terminal via the wireless communication unit 602 to the master eNB. The wired communication unit 604 also receives the specification information from the master eNB.

(Functional Configuration of Terminal)

Figure 7:
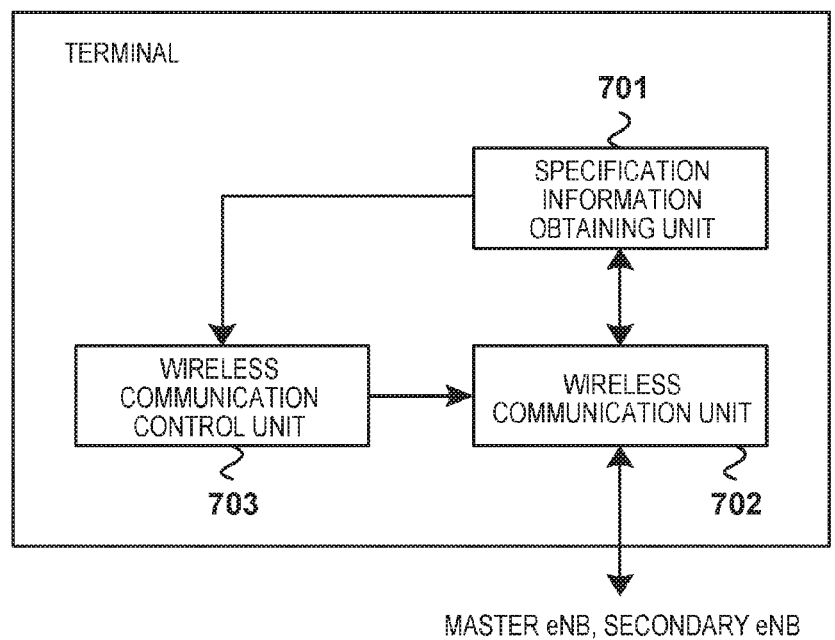
FIG. 7 is a block diagram showing an example of a functional configuration of the terminal.

FIG. 7 is a block diagram showing an example of a functional configuration of the terminal. The terminal includes, for example, a specification information obtaining unit 701, a wireless communication unit 702, and a wireless communication control unit 703. It will be assumed that the terminal also has functions of a general wireless communication apparatus, although not shown in FIG. 7. For example, the terminal further has a function of obtaining data transmitted via wireless communication, a function of generating a signal for wireless communication from the data, a function of extracting data from a signal obtained by the wireless communication unit 702, and the like.

The specification information obtaining unit 701 obtains, from the master eNB, the specification information that specifies the subframes in which the first frequency band should be used and the subframes in which the second frequency band should be used among the plurality of subframes included in one or more frames. The specification information is obtained by, for example, receiving PDCCH, which is a physical control channel, via the wireless communication unit 702. The specification information may be, for example, a bitmap that specifies the subframes in which the first frequency band should be used, a bitmap that specifies the subframes in which the second frequency band should be used, or the like. In this case, it is permissible to give notice of the third and subsequent frequency bands in the form of a bitmap in a similar manner. When it is sufficient to give notice of a bitmap on the basis of only two frequency bands consisting of the first and second frequency bands, it is permissible to give notice of a bitmap related to only one of the frequency bands, that is to say, a bitmap that specifies the subframes in which one of the frequency bands should be used.

The terminal may store information of at least two different patterns that specify the subframes in which the first frequency band should be used and the subframes in which the second frequency band should be used as specification patterns that specify the frequency bands to be used. In this case, the terminal receives, from the master eNB, information that specifies which of the at least two specification patterns should be used in actual communication as the specification information. For example, when the number of the specification patterns is two, the specification information obtaining unit 701 can obtain the specification information from the master eNB using one bit representing "0" or "1."

The specification information obtaining unit 701 may prepare a plurality of candidates for the aforementioned specification patterns, and obtain a signal that specifies which of the candidates should be used as the specification patterns before the notification of the specification information. In this case, the specification information obtaining unit 701 obtains, from the master eNB, the indexes of the specification patterns that should be actually used among the candidates of the at least two specification patterns that could be specified by the specification information. For example, as shown in FIG. 5, the specification information obtaining unit 701 stores four candidates for the specification patterns, and obtains, from the master eNB, information that specifies two of the four candidates, e.g., "0" and "3." The terminal accordingly selects pattern 0 and pattern 3 shown in FIG. 5 as specification patterns that could be specified by the specification information. Then, the terminal waits for the master eNB to specify which one of pattern 0 and pattern 3 shown in FIG. 5 should be actually used with the use of one bit representing "0" or "1." If the specification information obtaining unit 701 receives a bit representing "0," then it acknowledges that specification pattern 0, i.e., pattern 0 shown in FIG. 5 should be used. Similarly, if the specification information obtaining unit 701 receives a bit representing "1," then it acknowledges that specification pattern 1, i.e., pattern 3 shown in FIG. 5 should be used. By thus storing a plurality of candidates for the specification patterns beforehand and giving notice of information that narrows the candidates down to at least two candidates that could be actually specified by the specification information, the terminal and the master eNB can flexibly share the specification patterns with a small amount of information.

The specification information obtaining unit 701 may obtain information related to the at least two specification patterns in the form of bitmaps instead of the indexes of the candidates for the specification patterns stored beforehand. That is to say, before obtaining the specification information, the specification information obtaining unit 701 may obtain, from the master eNB, 1000010000 representing pattern 0 shown in FIG. 5 and 1011110111 representing pattern 3 shown in FIG. 5 as information indicating the specification patterns. This eliminates the need for the master eNB and the terminal to hold information of the common candidates for the specification patterns beforehand, and makes it easy to allocate the frequency bands that should be used by the terminal in a more flexible manner. The specification information obtaining unit 701 may obtain information of the frequency bands that should be used in the subframes at that point in the form of a bitmap, not as the information of the specification patterns, but as the specification information.

When the specification information obtaining unit 701 has obtained the specification information, it may notify the master eNB of the confirmation signal representing a confirmation that the specification information has been obtained via the wireless communication unit 702. This allows the master eNB that has transmitted the specification information to acknowledge whether the terminal has securely received the specification information on the basis of whether the confirmation signal has been transmitted. When the master eNB has received the confirmation signal even though it has not transmitted the specification information, it can acknowledge that the terminal has erroneously determined that the terminal has obtained the specification information.

The specification information obtaining unit 701 may have the confirmation signal contain information related to the obtained specification information. For example, when the specification information indicates "1" representing one of the specification patterns, the specification information obtaining unit 701 may have the confirmation signal contain information indicating "1." In this way, for example, when the notified specification information is obtained as different specification information, the master eNB can be informed to that effect. By receiving such information, the master eNB can determine that the specification information has been set erroneously, and hence re-notify the terminal of the specification information that should be actually used.

Under control by the wireless communication control unit 703 based on the specification information, the wireless communication unit 702 performs wireless communication with the master eNB in the subframes in which the first frequency band should be used, and with the secondary eNB in the subframes in which the second frequency band should be used. The specification information does not specify that a signal must be always transmitted or received in specified subframes in which the corresponding frequency bands should be used, but specifies a frequency band that should be used when performing communication is desired in a certain subframe. For example, assume a case in which the terminal intends to transmit data that needs to be real-time at a certain timing but the second frequency band should be used at that timing; in this case, the terminal does not transmit a signal at that timing because the first frequency band cannot be used. The terminal waits for a subframe in which the first frequency band should be used, and then transmits the real-time data. At this time, when the terminal does not hold data to be transmitted using the second frequency band, data may not be transmitted in the subframes in which the second frequency band should be used. For example, when the terminal or the eNBs keep transmitting certain information in each subframe in the wireless communication system, the terminal may transmit or receive a signal on the basis of the specification information in every subframe.

In conformity with the specification information obtained by the specification information obtaining unit 701, the wireless communication control unit 703 controls the wireless communication unit 702 to communicate with the master eNB in the subframes in which the first frequency band should be used, and with the secondary eNB in the subframes in which the second frequency band should be used. The wireless communication control unit 703 may start communication control based on the specification information after a predetermined time period has elapsed since the specification information obtaining unit 701 obtained the specification information. This predetermined time period may be equal to a predetermined time period between the transmission of the specification information and the start of communication control by the master eNB, or may have a value obtained by subtracting a delay in propagation between the master eNB and the terminal from that predetermined time period. The wireless communication control unit 703 may start communication control based on the specification information after a predetermined time period has elapsed since the specification information obtaining unit 701 transmitted the confirmation signal. This predetermined time period may be equal to a predetermined time period between the reception of the confirmation signal and the start of communication control by the master eNB, or may have a value obtained by adding the delay in propagation between the master eNB and the terminal to that predetermined time period. Note that the delay in propagation can be ignored as it is considered to be sufficiently small.

The wireless communication control unit 703 may control the wireless communication unit 702 to always perform communication using the first frequency band in a predetermined subframe. For example, in FIG. 5, all candidates for the specification patterns stipulate that the first frequency band should be used in the 0th subframe. In this way, throughout a unit of one or more frames, it is possible to secure an occasion to receive a control signal from the master eNB in at least one subframe. Similarly, the wireless communication control unit 703 may control the wireless communication unit 702 to always perform communication using the second frequency band in a second predetermined subframe. For example, in FIG. 5, all candidates for the specification patterns stipulate that the second frequency band should be used in the 1st subframe. In this way, throughout a unit of one or more frames, it is possible to secure an occasion to receive a control signal from the secondary eNB in at least one subframe.

When it is stipulated beforehand that a predetermined frequency band be always used in a predetermined subframe, information related to the predetermined subframe may not be transmitted via at least one of the specification information and information that designates the specification patterns. In this way, for example, as information of one subframe is not transmitted, the amount of information in a bitmap(s) that designates at least one of the specification information and the specification patterns can be reduced by one bit. Similarly, information related to the second predetermined subframe may not be transmitted.

As such, the master eNB determines the frequency bands that should be used by terminals, and notifies the terminals and the secondary eNB of the determined frequency bands as the specification information. As the terminals and the secondary eNB operate in conformity with the specification information, the master eNB, the secondary eNB, and the terminals can operate in conformity with the same determination.

(Operations of System)

Figure 8:
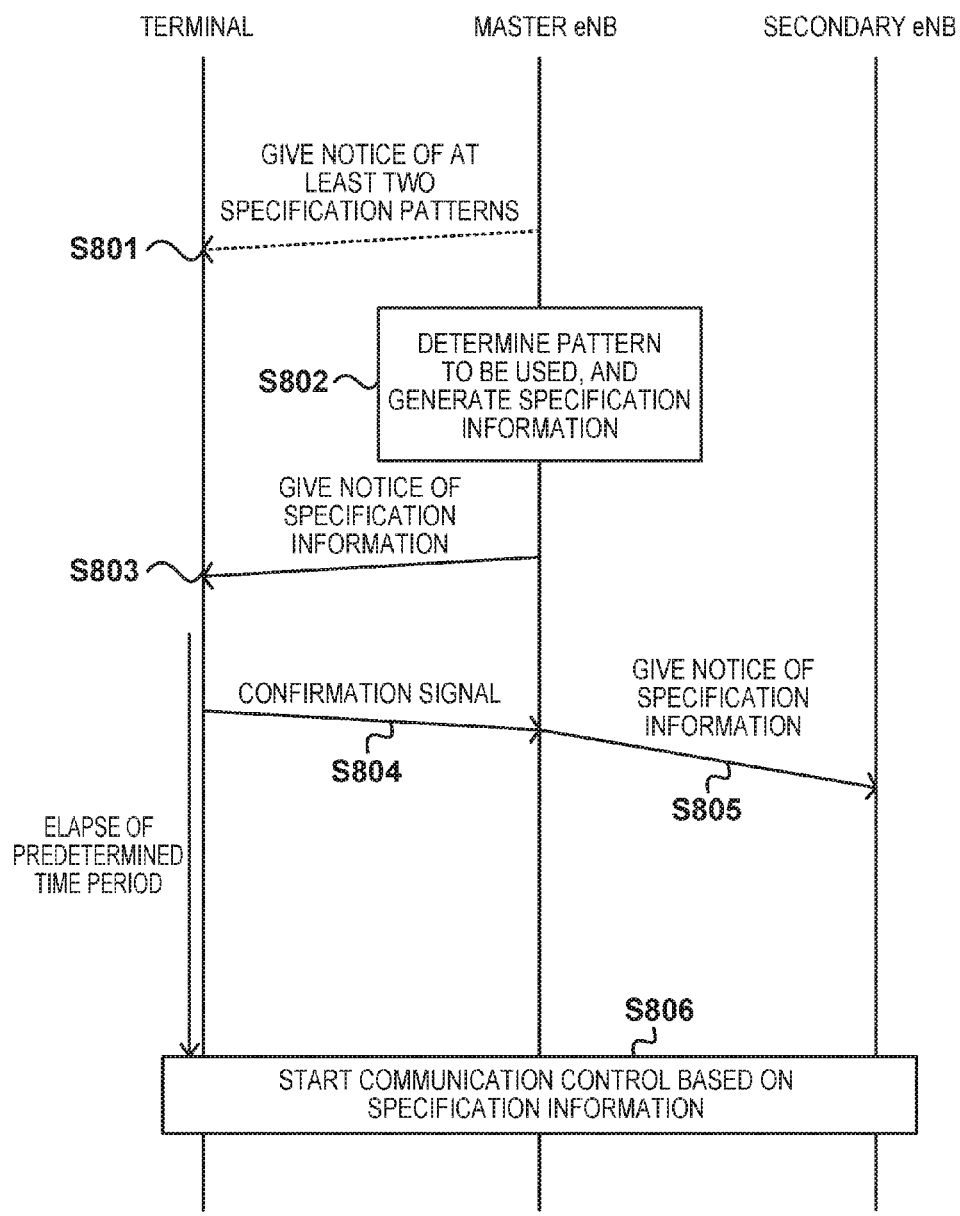
FIG. 8 is a sequence chart showing examples of operations of the master eNB, the secondary eNB, and the terminal.

A description is now given of typical examples of operations of the wireless communication system according to the present embodiment. FIG. 8 is a sequence chart showing examples of operations of the master eNB, the secondary eNB, and the terminal.

In FIG. 8, first of all, the master eNB initially notifies the terminal of information of at least two specification patterns (step S801). When notified of this information of the specification patterns, the terminal sets the specification patterns accordingly. Thereafter, the terminal may notify the master eNB of the completion of setting of the specification patterns. This process may be omitted when the master eNB and the terminal share the at least two specification patterns. At this point, the master eNB may notify the secondary eNB of this information of the specification patterns.

When the terminal and the master eNB store information of the candidates shown in FIG. 5, the information of the specification patterns notified here is, for example, information for selecting the specification patterns from among the candidates (e.g., "0" that specifies pattern 0, and "3" that specifies pattern 3). The information of the specification patterns notified here may be, for example, bitmaps indicating which frequency bands should be used in the subframes with respect to the at least two specification patterns (e.g., "1000010000" and "1011110111" representing pattern 0 and pattern 3 shown in FIG. 5). To give notice of the specification patterns in the form of bitmaps, for example, when the first and second frequency bands are always used in the $0^{th}$ and $1^{st}$ subframes, respectively, information related to these subframes may be omitted. That is to say, it is permissible to give notice of pattern 0 and pattern 3 as "00010000" and "11110111," respectively. This is because, when the first and second frequency bands are always used in the $0^{th}$ and $1^{st}$ subframes, respectively, the first two bits of the bitmaps are always "10," and the terminal acknowledges information of these two bits without being notified of the same.

Subsequently, the master eNB determines a pattern that should be used by the terminal among the at least two specification patterns, and generates specification information specifying the pattern that should be used in accordance with the determination (step S802). This determination process may be executed when at least one of U-plane data and C-plane data is to be transmitted to the UE or when the UE has requested a signal transmission, or may be executed at a regular interval of a predetermined time period.

Then, the master eNB notifies the terminal of the generated specification information (step S803). At this point, the master eNB may also notify the secondary eNB of the specification information. Here, the master eNB transmits the specification information using, for example, PDCCH, which is a physical control channel. A downlink control information (DCI) format for transmitting the specification information may be separately prepared, or bits for transmitting the specification information may be added to an existing DCI format. The master eNB can give notice of the specification information using, for example, the number of bits corresponding to the number of the specification patterns notified in step S801.

Specifically, when two specification patterns have been designated, the master eNB can give notice of which of these specification patterns should be used using one bit. When four specification patterns have been designated, the master eNB can give notice of which of these specification patterns should be used using two bits. Such transmission of the specification information via a physical channel using a few bits enables high-speed switching between patterns with low overhead.

Specification patterns may not be limited beforehand, in which case the master eNB can, for example, notify the terminal of 10-bit information specifying whether a corresponding frequency band should be used in each of the ten subframes included in one frame.

Once the terminal has been notified of the specification information (step S803), the terminal transmits, to the master eNB, a confirmation signal representing a confirmation that the specification information has been received (step S804). For example, the confirmation signal may be an ACK or a NACK, or may be a signal containing information related to the specification information. This confirmation signal may be transmitted via a physical uplink control channel (PUCCH). The time, frequency, and code resources for this confirmation signal may be allocated to the terminal beforehand. The ACK or NACK may be transmitted by using a response signal to an existing PDSCH as-is. When an incorrect pattern has been set in the terminal, the confirmation signal containing information related to the specification information allows the eNB to acknowledge such incorrect setting. When one pattern to be used is selected from among two specification patterns, the terminal may notify the eNB of setting of specification pattern 0 using the ACK, and setting of specification pattern 1 using the NACK.

For example, when every pattern is structured so as to always communicate with the master eNB in the $0^{th}$ subframe, even if an incorrect pattern is set in the terminal, the terminal can obtain information of a correct pattern by communicating with the master eNB in that subframe.

Upon receiving the confirmation signal from the terminal (step S804), the master eNB subsequently notifies the secondary eNB of the specification information (step S805). Here, it is sufficient to pass information of subframes in which the secondary eNB should communicate with the terminal; information indicating which frequency bands should be used by the terminal, or with which eNB the terminal should communicate, in all of the subframes may not be given.

The terminal activates a non-illustrated timer at the time of reception of the specification information, or at the time of transmission of the confirmation signal, and waits for the elapse of a predetermined time period (e.g., several milliseconds) since that time. This predetermined time period may be set beforehand in accordance with the specifications and the like, or may be changed dynamically. When the predetermined time period is changed dynamically, the master eNB may notify the terminal (and the secondary eNB) of information of the predetermined time period by RRC signaling and the like.

When the terminal waits for the elapse of the predetermined time period since the time of reception of the specification information, the master eNB waits for the elapse of the same predetermined time period, or the elapse of a time period obtained by adding a time period of a delay in propagation between the master eNB and the terminal to that predetermined time period, since the master eNB gave notice of the specification information. When the master eNB gives notice of the specification information not only to the terminal but also to the secondary eNB in step S803, the secondary eNB waits for the elapse of a time period obtained by subtracting a time period of a delay in transmission between the master eNB and the secondary eNB from the predetermined time period waited by the terminal since the secondary eNB received the notice. The secondary eNB may wait for the elapse of a time period obtained by subtracting a time period of a delay in propagation between the master eNB and the terminal from the foregoing time period. When the secondary eNB is not notified of the specification information in step S803, for example, the secondary eNB may wait for the elapse of the following time period since it was notified of the specification information in step S805: a time period obtained by subtracting, from the foregoing time period, a time period between when the terminal receives the specification information from the master eNB and when the terminal transmits the confirmation signal.

On the other hand, when the terminal waits for the elapse of the predetermined time period since the time of transmission of the confirmation signal, the master eNB waits for the elapse of the same predetermined time period, or the elapse of a time period obtained by subtracting a time period of a delay in propagation between the master eNB and the terminal from that predetermined time period, since the reception of the confirmation signal. After the master eNB has notified the secondary eNB of the specification information, the secondary eNB waits for the elapse of a time period obtained by subtracting a time period of a delay in transmission between the master eNB and the secondary eNB from the time period waited by the master eNB.

Then, after the foregoing time periods have elapsed, the terminal, the master eNB, and the secondary eNB start communication control based on the specification information shared in steps S803 to S805. Specifically, in accordance with the pattern specified by the specification information, communication between the terminal and the master eNB is performed in subframes in which the first frequency band should be used, and communication between the terminal and the secondary eNB is performed in subframes in which the second frequency band should be used.

As such, the master eNB, the secondary eNB, and the terminal can share information of the frequency bands that should be used by the terminal (or the eNB that the terminal should connect to), and perform communication control all together in conformity with the information.

The above has described the configurations and operations of the master eNB, the secondary eNB, and the terminal. Although the above embodiment has described a typical case in which one secondary eNB and one terminal are present, no limitation is intended in this regard. For example, when there are a plurality of terminals, it is obvious that the master eNB can execute the above-described processing in coordination with the terminals and a secondary eNB that is located in the vicinity of the terminals. When there are a plurality of secondary eNBs that use different frequency bands, the number of frequency bands that should be used simply increases from two to three or more, and it is sufficient for the master eNB to notify the terminal of specification information that specifies which of the three or more frequency bands should be used by the terminal. Furthermore, at this time, it is sufficient for the master eNB to notify each secondary eNB of information of subframes in which the terminal should use the frequency band corresponding to the secondary eNB. When the plurality of secondary eNBs use the same frequency band, a configuration similar to the configuration of the case of one secondary eNB is applicable because simultaneous waits are possible with respect to the plurality of secondary eNBs. When the plurality of secondary eNBs use the same frequency band, an existing resource allocation technique can be applied to determine which frequency and time resources are to be used.

The present invention is not limited to the above-described embodiment, and various changes and modifications can be made within the spirit and scope of the present invention. Therefore, to apprise the public of the scope of the present invention, the following claims are made.

What is claimed is:

1. A communication apparatus, comprising:
   processor, and a memory for storing a program for being executed by the processor;
   a communication unit configured to perform communication under control of the processor in a manner such that communication with a first base station apparatus using a first frequency band and communication with a second base station apparatus using a second frequency band are switched on a per-subframe basis;
   the processor executing the program to function as:
   an obtaining unit configured to obtain specification information from the first base station apparatus, the specification information specifying, among a plurality of subframes included in one or more frames, a subframe in which the first frequency band is to be used and a subframe in which the second frequency band is to be used; and
   a control unit configured to control the communication unit, on the basis of the specification information, to communicate with the first base station apparatus in the subframe in which the first frequency band is to be used, and to communicate with the second base station apparatus in the subframe in which the second frequency band is to be used.

2. The communication apparatus according to claim 1, further comprising
the memory configured to store information of at least two different patterns that specify, among the plurality of subframes included in one or more frames, the subframe in which the first frequency band is to be used and the subframe in which the second frequency band is to be used, wherein
the obtaining unit obtains, from the first base station apparatus, information that specifies which of the at least two patterns is to be used as the specification information.

3. The communication apparatus according to claim 2, wherein
the memory further stores, as candidates for the at least two patterns, information of a plurality of different patterns that specify, among the plurality of subframes included in one or more frames, the subframe in which the first frequency band is to be used and the subframe in which the second frequency band is to be used, and
the obtaining unit obtains, from the first base station apparatus, information indicating which of the candidates are used as the at least two patterns.

4. The communication apparatus according to claim 2, wherein
the obtaining unit obtains, from the first base station apparatus, at least one of information indicating in which subframe the first frequency band is to be used and information indicating in which subframe the second frequency band is to be used with respect to each of the at least two patterns.

5. The communication apparatus according to claim 1, further comprising
a transmission unit configured to transmit under control of the processor a confirmation signal containing information related to the specification information to the first base station apparatus.

6. The communication apparatus according to claim 5, further comprising
the processor executing the program to function as a determination unit configured to determine whether the specification information has been obtained from the first base station apparatus, wherein
the transmission unit transmits the confirmation signal to the first base station apparatus when it has been determined that the specification information has been obtained from the first base station apparatus.

7. The communication apparatus according to claim 5, wherein
the transmission unit transmits the confirmation signal via a physical uplink control channel.

8. The communication apparatus according to claim 5, wherein
the control unit starts control over the communication unit on the basis of the specification information after a predetermined time period has elapsed since transmission of the confirmation signal.

9. The communication apparatus according to claim 1, wherein
the control unit starts control over the communication unit on the basis of the specification information after a predetermined time period has elapsed since obtainment of the specification information from the first base station apparatus.

10. The communication apparatus according to claim 1, wherein
the control unit controls the communication unit to communicate with the first base station apparatus using the first frequency band in a first predetermined subframe.

11. The communication apparatus according to claim 1, wherein
the control unit controls the communication unit to communicate with the second base station apparatus using the second frequency band in a second predetermined subframe.

12. The communication apparatus according to claim 1, wherein
the first base station apparatus is wiredly or wirelessly connected to the second base station apparatus, and
a signal transmitted from the communication apparatus to the second base station apparatus using the second frequency band is transferred to the first base station apparatus, and a signal to be transmitted to the communication apparatus in the subframe in which the second frequency band is to be used is transmitted from the first base station apparatus to the second base station apparatus and transmitted from the second base station apparatus to the communication apparatus in the subframe in which the second frequency band is to be used.

13. A base station apparatus that is included in a wireless communication system and communicates with a communication apparatus using a first frequency band, the wireless communication system also including the communication apparatus that performs communication while switching between the first frequency band and a second frequency band on a per-subframe basis, and another base station apparatus that communicates with the communication apparatus using the second frequency band, the base station apparatus comprising:
a processor, and a memory for storing a program for being executed by the processor to function as a notification unit configured to notify the communication apparatus and the other base station apparatus of specification information that specifies, among a plurality of subframes included in one or more frames, a subframe in which the communication apparatus is to use the first frequency band and a subframe in which the communication apparatus is to use the second frequency band; and
a communication unit configured to communicate under control of the processor with the communication apparatus using the subframe in which the communication apparatus is to use the first frequency band as specified by the specification information.

14. The base station apparatus according to claim 13, further comprising
the memory configured to store information of at least two different patterns that specify, among the plurality of subframes included in one or more frames, the subframe in which the first frequency band is to be used and the subframe in which the second frequency band is to be used, wherein
the notification unit notifies the communication apparatus of information that specifies which of the at least two patterns is to be used as the specification information.

15. The base station apparatus according to claim 14, wherein
the memory further stores, as candidates for the at least two patterns, information of a plurality of different patterns that specify, among the plurality of subframes included in one or more frames, the subframe in which the first frequency band is to be used and the subframe in which the second frequency band is to be used, and the notification unit notifies the communication apparatus of information indicating which of the candidates are used as the at least two patterns.

16. The base station apparatus according to claim 14, wherein the notification unit notifies the communication apparatus of at least one of information indicating in which subframe the first frequency band is to be used and information indicating in which subframe the second frequency band is to be used with respect to each of the at least two patterns.

17. The base station apparatus according to claim 14, wherein the notification unit notifies the communication apparatus of the specification information indicating that the communication apparatus is to use the first frequency band in a first predetermined subframe with respect to all of the at least two patterns.

18. The base station apparatus according to claim 14, wherein the notification unit notifies the communication apparatus of the specification information indicating that the communication apparatus is to use the second frequency band in a second predetermined subframe with respect to all of the at least two patterns.

19. The base station apparatus according to claim 13, further comprising a receiving unit configured to receive under control of the processor, from the communication apparatus, a confirmation signal representing a confirmation that the specification information has been received, wherein when the confirmation signal is not received within a predetermined time period since notification of the specification information to the communication apparatus, the notification unit re-notifies the communication apparatus of the specification information.

20. The base station apparatus according to claim 19, wherein when the confirmation signal is received without notification of the specification information to the communication apparatus, the notification unit notifies the communication apparatus of the specification information to which the communication apparatus is to conform.

21. The base station apparatus according to claim 19, wherein the confirmation signal contains information related to specification information notified to the communication apparatus, and when the information related to specification information notified via the confirmation signal is not information related to the specification information to which the communication apparatus is to conform, the notification unit notifies the communication apparatus of the specification information to which the communication apparatus is to conform.

22. The base station apparatus according to claim 19, wherein the notification unit notifies the other base station apparatus of the specification information after the confirmation signal has been received from the communication apparatus.

23. The base station apparatus according to claim 19, wherein the communication unit starts communication with the communication apparatus on the basis of the specification information after a predetermined time period has elapsed since reception of the confirmation signal from the communication apparatus.

24. The base station apparatus according to claim 13, wherein the communication unit starts communication with the communication apparatus on the basis of the specification information after a predetermined time period has elapsed since notification of the specification information.

25. The base station apparatus according to claim 13, wherein the other base station apparatus is wiredly or wirelessly connected to the base station apparatus, and the communication unit transmits to the other base station apparatus at least a part of a signal addressed to the communication apparatus, and/or receives from the other base station apparatus a signal that has been transmitted from the communication apparatus to the other base station apparatus using the second frequency band.

26. The base station apparatus according to claim 13, wherein the communication unit gives notice of the specification information via a physical downlink control channel.

27. A method of controlling a communication apparatus including communication unit configured to perform communication in a manner such that communication with a first base station apparatus using a first frequency band and communication with a second base station apparatus using a second frequency band are switched on a per-subframe basis, the method comprising:

obtaining specification information from the first base station apparatus, the specification information specifying, among a plurality of subframes included in one or more frames, a subframe in which the first frequency band is to be used and a subframe in which the second frequency band is to be used; and controlling the communication unit, on the basis of the specification information, to communicate with the first base station apparatus in the subframe in which the first frequency band is to be used, and to communicate with the second base station apparatus in the subframe in which the second frequency band is to be used.

28. A method of controlling a base station apparatus that is included in a wireless communication system and communicates with a communication apparatus using a first frequency band, the wireless communication system also including the communication apparatus that performs communication while switching between the first frequency band and a second frequency band on a per-subframe basis, and another base station apparatus that communicates with the communication apparatus using the second frequency band, the method comprising:

notifying the communication apparatus and the other base station apparatus of specification information that specifies, among a plurality of subframes included in one or more frames, a subframe in which the communication apparatus is to use the first frequency band and a subframe in which the communication apparatus is to use the second frequency band; and communicating with the communication apparatus using the subframe in which the communication apparatus is to use the first frequency band as specified by the specification information.

29. A non-transitory computer-readable storage medium storing a program that causes a computer included in a communication apparatus to execute a method for controlling the communication apparatus, the communication apparatus including communication unit configured to perform communication in a manner such that communication with a first base station apparatus using a first frequency band and communication with a second base station apparatus using a second frequency band are switched on a per-subframe basis, the method comprising:

obtaining specification information from the first base station apparatus, the specification information specifying, among a plurality of subframes included in one or more frames, a subframe in which the first frequency band is to be used and a subframe in which the second frequency band is to be used; and controlling the communication unit, on the basis of the specification information, to communicate with the first base station apparatus in the subframe in which the first frequency band is to be used, and to communicate with the second base station apparatus in the subframe in which the second frequency band is to be used.

30. A non-transitory computer-readable storage medium storing a program for causing a computer included in a base station apparatus to execute a method for controlling the base station apparatus, the base station apparatus being included in a wireless communication system and communicating with a communication apparatus using a first frequency band, the wireless communication system also including the communication apparatus that performs communication while switching between the first frequency band and a second frequency band on a per-subframe basis, and another base station apparatus that communicates with the communication apparatus using the second frequency band, the method comprising:

notifying the communication apparatus and the other base station apparatus of specification information that specifies, among a plurality of subframes included in one or more frames, a subframe in which the communication apparatus is to use the first frequency band and a subframe in which the communication apparatus is to use the second frequency band; and communicating with the communication apparatus using the subframe in which the communication apparatus is to use the first frequency band as specified by the specification information.

\* \* \* \* \*